US012675533B1

(12) United States Patent
Jahjah et al.

(10) Patent No.: US 12,675,533 B1
(45) Date of Patent: Jul. 7, 2026

(54) SEMANTIC MULTIMODAL SEARCH OF ENGINEERING DOCUMENTS

(71) Applicant: Bentley Systems, Incorporated, Exton, PA (US)

(72) Inventors: Karl-Alexandre Jahjah, Quebec City (CA); Marc-André Gardner, Quebec City (CA); Marc-André Lapointe, Quebec City (CA); Evan Rausch-Larouche, Quebec City (CA); Louis-Philippe Asselin, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 146 days.

(21) Appl. No.: 18/591,775

(22) Filed: Feb. 29, 2024

(51) Int. Cl.
*G06F 16/00* (2019.01)
*G06F 16/901* (2019.01)
*G06F 16/9038* (2019.01)
*G06F 16/93* (2019.01)
*G06N 5/02* (2023.01)

(52) U.S. Cl.
CPC ............ *G06F 16/93* (2019.01); *G06F 16/901* (2019.01); *G06F 16/9038* (2019.01); *G06N 5/02* (2013.01)

(58) Field of Classification Search
CPC .... G06F 16/93; G06F 16/901; G06F 16/9038; G06N 5/02
USPC ........................................................ 707/722
See application file for complete search history.

(56) References Cited

U.S. PATENT DOCUMENTS

| | | | |
|---|---|---|---|
| 9,092,802 B1 | 7/2015 | Akella | |
| 10,459,995 B2 | 10/2019 | Lev-Tov et al. | |
| 10,885,039 B2 | 1/2021 | Hornkvist et al. | |
| 11,663,229 B2 | 5/2023 | Beard et al. | |
| 11,721,329 B2 | 8/2023 | Kumar et al. | |
| 2020/0133970 A1* | 4/2020 | Khabiri ................. | G06N 3/045 |

(Continued)

OTHER PUBLICATIONS

Lin, Ken-Yu, et al., "Incorporating Domain Knowledge and Information Retrieval Techniques to Develop an Architectural/Engineering/Construction Online Product Search Engine," ASCE, Journal of Computing in Civil Engineering, vol. 23, No. 4, Jul. 1, 2009, pp. 201-210.

(Continued)

*Primary Examiner* — Raquel Perez-Arroyo
(74) *Attorney, Agent, or Firm* — Cesari and McKenna, LLP; James A. Blanchette

(57) ABSTRACT

In example embodiments, a semantic multimodal search function is provided in an engineering application for searching engineering documents. In an indexing phase, the application indexes a library of engineering documents to build an embedding database. For each of the engineering documents, a region detector extracts regions that each correspond to a different mode of technical or engineering data, and a set of ML models is used to generate embeddings that represent the semantic significance of technical or engineering data in each of the regions. In a query phase, the application receives search input and uses the region detector to extract regions that each correspond to a different mode of input. The application uses the ML models to generate embeddings that represent the semantic significance of input in each of the regions, and then performs a vector search between these embeddings and those in the embedding database.

20 Claims, 4 Drawing Sheets

(56)     References Cited

U.S. PATENT DOCUMENTS

| | | | |
|---|---|---|---|
| 2020/0311798 A1 | 10/2020 | Forsyth et al. | |
| 2022/0261427 A1 | 8/2022 | Kovacs et al. | |
| 2023/0055241 A1* | 2/2023 | Zionpour ............. | G06F 40/186 |
| 2023/0419571 A1* | 12/2023 | Zhang .................. | G06F 16/532 |
| 2024/0232258 A9* | 7/2024 | Mahfuz ................ | G06F 16/638 |

OTHER PUBLICATIONS

Radford, Alec, et al., "CLIP: Connecting Text and Images," OpenAI, Retrieved from the Internet: <http://openai.com/research/clip>, Jan. 5, 2021, pp. 1-13.

Radford, Alec, et al., "Learning Transferable Visual Models From Natural Language Supervision," arXiv, Proceedings of the 38th International Conference on Machine Learning, PMLR 139, arXiv:2103. 00020 [cs.CV], Feb. 26, 2021, pp. 1-16.

Tautkute, Ivona, et al., "DeepStyle: Multimodal Search Engine for Fashion and Interior Design," IEEEAccess, vol. 7, Jun. 17, 2019, pp. 84613-84628.

* cited by examiner

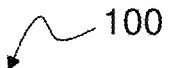

CLIENT-SIDE SOFTWARE 110

USER INTERFACE
120

- - - - - - - - - - - - - - - - - - - - - - - - - - - - - - - - - - - - - - - - - - - - - - - - - - - - - - - - - - -

CLOUD-BASED SOFTWARE 112

LIBRARY OF
ENGINEERING
DOCUMENTS 130

EMBEDDING
DATABASE 140

REGION DETECTOR
150

VECTOR SEARCH
MODULE 180

FILTER MODULE 190

TEXT ENGINE 172

| TEXT EMBEDDING ML MODEL 162 | OCR FUNCTION 163 |

IMAGE ENGINE 174

| IMAGE EMBEDDING ML MODEL 164 | IMAGE-TO-TEXT DESCRIPTION 165 |

SCHEMATIC ENGINE 176

| SCHEMATIC EMBEDDING ML MODEL 166 | SCHEMATIC-TO-TEXT DESCRIPTION 167 |

CAD MODEL ENGINE 178

| CAD MODEL EMBEDDING ML MODEL 168 | CAD MODEL-TO-TEXT DESCRIPTION 169 |

AGGREGATION ML
MODEL 170

QUERY REFINEMENT
ML MODEL 195

EXTRACT DOCUMENT METADATA 210

STORE DOCUMENT METADATA 220

EXTRACT REGIONS 230

EXTRACT REGION METADATA 240

STORE REGION METADATA 250

DETERMINE TEXT DESCRIPTIONS FOR NON-TEXT REGIONS 260

STORE TEXT DESCRIPTIONS 270

GENERATE DOCUMENT EMBEDDINGS 280

STORE DOCUMENT EMBEDDINGS 290

310

312

314

316

320

322

324

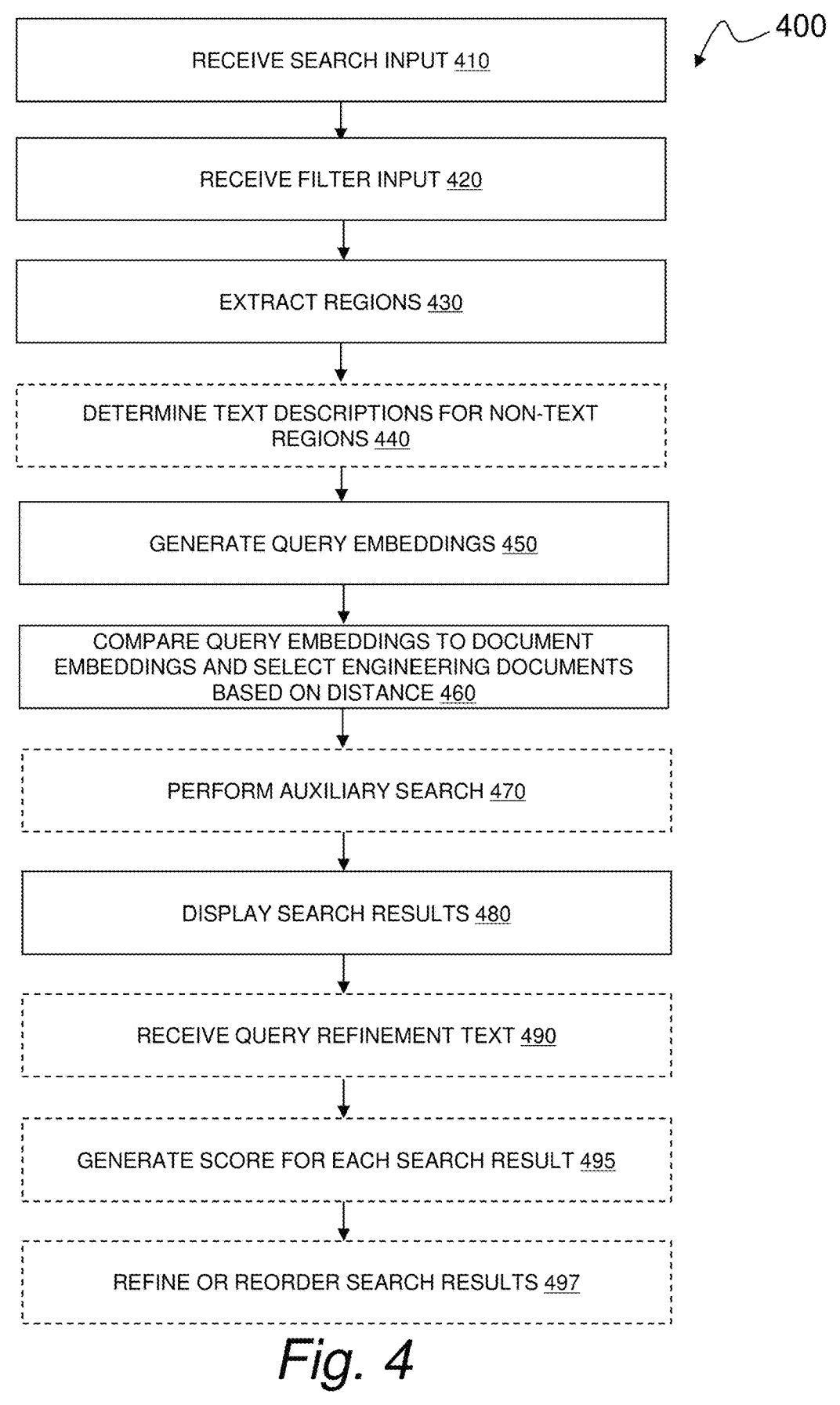

400

RECEIVE SEARCH INPUT 410

RECEIVE FILTER INPUT 420

EXTRACT REGIONS 430

DETERMINE TEXT DESCRIPTIONS FOR NON-TEXT REGIONS 440

GENERATE QUERY EMBEDDINGS 450

COMPARE QUERY EMBEDDINGS TO DOCUMENT EMBEDDINGS AND SELECT ENGINEERING DOCUMENTS BASED ON DISTANCE 460

PERFORM AUXILIARY SEARCH 470

DISPLAY SEARCH RESULTS 480

RECEIVE QUERY REFINEMENT TEXT 490

GENERATE SCORE FOR EACH SEARCH RESULT 495

REFINE OR REORDER SEARCH RESULTS 497

*Fig. 4*

SEMANTIC MULTIMODAL SEARCH OF ENGINEERING DOCUMENTS

BACKGROUND

Technical Field

The present disclosure relates generally to techniques for extracting knowledge from engineering information, and more specifically to techniques for searching engineering documents.

Background Information

As part of the design and construction of engineering projects (e.g., infrastructure projects such as buildings, factories, plants, roads, railways, utility networks, etc.), companies typically generate large numbers of engineering documents. As used herein, the term "engineering document" refers to a document (i.e. file) that includes technical or engineering data regarding an engineering project (e.g., an infrastructure project) or standard (e.g., a building code). Examples of engineering documents may include text documents, images, portable document format (PDF) documents, two-dimensional (2D) schematic diagrams (e.g., piping and instrumentation diagrams (P&IDs), electrical wiring diagrams, floorplans and construction drawings, etc.), three-dimensional (3D) computer aided design (CAD) models (e.g., infrastructure models), as well as other types of documents. Engineering documents are typically maintained in a library (e.g., a repository or other archive). Both collectively and individually engineering documents of a library may be multimodal. As used herein, the term "multimodal" refers to containing different modes (i.e. types) of technical or engineering data. Examples of different modes of technical or engineering data may include text data, image data, schematic data (e.g., symbols and links), CAD model data (e.g., model elements), among others. Engineering documents in a library may be multimodal in the sense that different engineering documents in the library include different modes of technical or engineering data (e.g., a library stores both text documents that includes text data and image documents that include image data), as well as in the sense that individual engineering documents in the library include multiple modes of technical or engineering data (e.g., a single PDF document contains both text data and image data, a single P&ID contains both schematic data and text data, etc.).

Locating relevant information in libraries of engineering documents is often challenging. Search functions built into existing engineering software applications often do not well consider context, instead focusing only on keywords. The words or other data surrounding keywords are often largely ignored, sometimes leading to missing or badly ranked results. Likewise, search functions of existing engineering applications are often single modal. Many search functions only accept a single mode of input (e.g., only text input). They cannot receive a variety of other modes of input (e.g., image input, or schematic input, or CAD model input, etc.), or combinations of multiple modes of input (e.g., text input and image input, and schematic input, and CAD model input, etc.). Likewise, many search functions only return a single mode of output (e.g., only text data as output). Even if the search function is able to retrieve another type of engineering document, the underlying search is often conducted in a single mode. For example, the search may return a PDF document because text in the document matches a keyword of search input, not because an image included in the document shows a portion of an engineering project relevant to the search input. Further, search functions of existing engineering applications often heavily rely on the phrasing or form of the user's search input. If the user does not include precise terms or operators in their search input, but instead uses alternative phrasing, relevant information may be missed.

When relevant information in a library of engineering documents is missed, great inefficiency may be introduced to engineering workflows. Both computing resources (e.g., processing and memory resources) and human resources may be wasted reproducing lost knowledge and generating duplicative engineering documents. Accordingly, there is a need for improved techniques for searching engineering documents.

SUMMARY

In various embodiments, a semantic multimodal search function is provided in an engineering application for searching engineering documents. Operations of the search function may be broadly divided into two phases: an indexing phase and a query phase. In the indexing phase, the engineering application indexes a library of engineering documents to build an embedding database. For each of the engineering documents in the library, a region detector may extract one or more regions that each correspond to a different mode of technical or engineering data (e.g., text data, image data, schematic data, CAD model data, etc.). A set of machine learning (ML) models may then be used to generate embeddings (referred to herein as "document embeddings") that represent the semantic significance of technical or engineering data in each of the plurality of regions of the engineering documents, which are stored in the embedding database. In the query phase, the engineering application receives search input from a user, and uses the region detector to extract from the search input one or more regions that each correspond to a different mode of input (e.g., text input, image input, schematic input, CAD model input, etc.). The same set of ML models may then be used to generate embeddings (referred to herein as "query embeddings") that represent the semantic significance of input in each of the regions of the search input. The engineering application performs a vector search by calculating a distance between the query embeddings and the document embeddings of the embedding database, and select one or more engineering documents having closest document embeddings. The engineering application may then display search results based on the selected one or more engineering documents. The search results may include the entire engineering documents, regions of the engineering documents, or specific information extracted from the engineering documents.

In some embodiments, the generation of the embeddings in the indexing phase and the query phase may be facilitated by the use of temporary embeddings and/or intermediary text descriptions. With temporary embeddings, ML models adapted to the mode of input/data in regions first generate temporary embeddings that represent the semantic significance of the input/data, and an aggregation ML model aggregates the temporary embeddings to produce a main embedding that is used. With intermediary text descriptions, regions that contain a mode of input other than text are first converted to text descriptions describing semantic significance of input/data in the region, and a ML model adapted to text input then generates embeddings based on the text descriptions.

The semantic multimodal search function described herein may retrieve more relevant information from libraries of engineering documents than traditional search functions, preventing instances of knowledge loss and inadvertent duplicative document production. Avoiding such inefficiency may save both computing resources (e.g., processing and memory resources) and human resources.

In one specific embodiment, a method is provided for searching for engineering documents. An engineering application executing on one or more computing devices receives search input from a user. A region detector of the engineering application extracts from the search input a plurality of regions that each correspond to a different mode of input of a plurality of modes of input, wherein the plurality of modes of input include text input, image input, schematic input, and CAD model input. One or more ML models of the engineering application generate one or more query embeddings that represent the semantic significance of input in each of the plurality of regions. The engineering application compares the one or more query embeddings and a plurality of document embeddings of an embedding database that each correspond to a respective engineering document maintained in a library of engineering documents and selects one or more engineering documents having closest document embeddings. Search results based on the selected one or more engineering documents are displayed.

In another specific embodiment, a non-transitory computing device readable medium is provided. The medium has instructions stored thereon that when executed by one or more computing devices are operable to index a library of engineering documents to build an embedding database by, for each of a plurality of engineering documents in the library of engineering documents, extracting from the engineering document one or more regions that each correspond to a different mode of technical or engineering data, generating one or more document embeddings that represent the semantic significance of technical or engineering data in each of the one or more regions, and storing the one or more document embeddings in the embedding database. The instructions when executed are further operable to query the library of engineering documents by receiving search input, extracting from the search input one or more regions that each correspond to a different mode of input of a plurality of modes of input, generating one or more query embeddings that represent the semantic significance of input in each of the oner or more regions, and comparing the one or more query embeddings and embedding of the embedding database, and selecting one or more engineering documents based on the comparison. The instructions when executed are further operable to display search results based on the selected one or more engineering documents.

In yet another specific embodiment, a computing device is provided that comprises a display screen, a processor, and a memory coupled to the processor configured to store an engineering application that utilizes one or more ML models. The engineering application when executed is operable to receive search input from a user, extract from the search input a plurality of regions that each correspond to a different mode of input of a plurality of modes of input, wherein the plurality of modes of input include text input, image input, schematic input, and CAD model input, and generate using the one more ML models one or more query embeddings that represent the semantic significance of input in each of the plurality of regions. The engineering application when executed is further operable to compare the one or more query embeddings and a plurality of document embeddings of an embedding database that each correspond to a respective engineering document maintained in a library of engineering documents, and select one or more engineering documents having closest document embeddings. The engineering application when executed is further operable to display search results based on the selected one or more engineering documents.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which:

FIG. 1 is a high-level block diagram of an example engineering application that may provide a semantic multimodal search function for searching engineering documents;

FIG. 4 is an example sequence of steps that may be performed by the engineering application in a query phase to produce search results.

DETAILED DESCRIPTION

Figure 2:
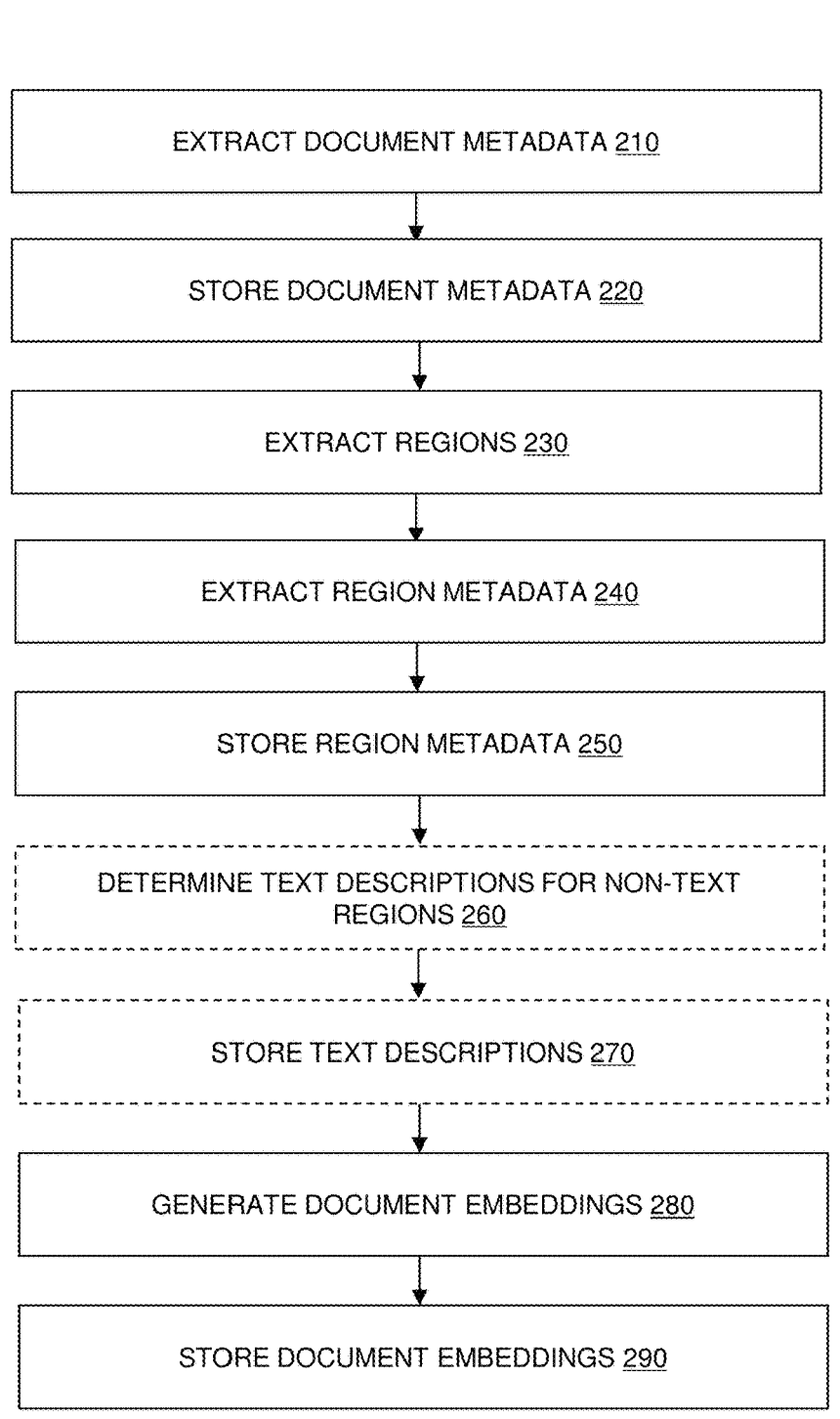
FIG. 2 is an example sequence of steps that may be performed by the engineering application in an indexing phase to produce an embedding database.

The following description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "lowest", "top," "bottom," and the like, should be understood to be used relative to a standard of comparison or perspective, and do not preclude differing orderings or orientations based on different standards of comparison or perspectives. No language in the description should be construed as indicating an element is a necessary or essential aspect of the disclosure.

FIG. 1 is a high-level block diagram of an example engineering application 100 that may provide a semantic multimodal search function for searching engineering documents. The engineering application 100 may be a stand-alone software application or a component of a larger software platform, for example, a component of the iTwin® platform that supports digital twin applications for infrastructure. The engineering application 100 may be divided into local software 110 that includes modules that execute on one or more computing devices local to an end-user (collectively "local devices") and, in some cases, cloud-based software 112 that includes modules that execute on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information.

In one embodiment, where the majority of more processing intensive operations take place in the cloud, the local software 110 may include one or more software modules, such as a user interface 120, configured to receive from a user search input and, optionally, filter input and/or query refinement text, and to display search results.

The cloud based software may include data storage and other modules. The data storage in the cloud may include a library of engineering documents 130 that include technical or engineering data (e.g., text data, image data, schematic data, CAD model data, etc.). The engineering documents in the library 130 may be multimodal both in the sense that different engineering documents include different modes of technical or engineering data and in the sense that individual engineering documents include multiple modes of technical or engineering data. The data storage in the cloud may also include an embedding database 140 that stores embeddings that each correspond to a region of a respective engineering document maintained in the library (i.e. "document embeddings"). As explained below, in some implementations, the document embeddings may include temporary document embeddings and main document embeddings. In addition to document embeddings, the embedding database 140, or one or more separate databases maintained in association therewith, may store other types of data for engineering documents such as metadata (e.g., document metadata and/or augmented metadata). As used herein, the term "document metadata" refers to characteristics of an engineering document as a whole, such as creation date, author, file location, etc. Document metadata often can simply be read from document properties (e.g., file properties). As used herein, the term "augmented metadata" refers to semantic information about the content of a specific region of an engineering document. Augmented metadata is often derived from the use of one or more ML models and may include classifications or tags predicted by the ML models. The modules in the cloud may include a region detector 150 configured to extract a plurality of regions that correspond to different modes of input/data (e.g., text input/data, image input/data, schematic input/data, CAD model input/data, etc.) from search input and engineering documents. The region detector 150 may employ different detection pipelines adapted to different types of input/documents the utilize various sub-modules. For example, for PDF-based input/documents, the region detector 150 may employ a pipeline that uses a rasterization sub-module and an ML image region detector (e.g., a specially trained convolutional neural network (CNN)). Likewise, for schematic diagrams and CAD models the region detector 150 may employ a pipeline that uses a ML graph structure detector (e.g., a specially trained GCN (Graph Convolutional Network) or GAT (Graph Attention Network)).

The modules in the cloud may also include a set of ML models (e.g., specially trained Multi-Layer Perceptrons (MLPs), CNNs, or Recurrent Neural Networks (RNNs)) used to produce query embeddings and document embeddings that represent the semantic significance of input/data. Embeddings are dense numerical representations expressed as a vector in vector space. The distance between embeddings in embedding space may quantify semantic similarity. The set of ML models may include individual ML models adapted to produce query embeddings and document embeddings based on different modes of input/data. For example, the set of ML models may include a text embedding ML model 162 configured to generate embeddings from text regions. Likewise, the set of ML models may include an image embedding ML model 164 configured to generate embeddings from image regions. Further the set of ML models may include a schematic embedding ML model 166 configured to generate embeddings from schematic regions. Still further, the set of ML models may include a CAD model embedding ML model 168 configured to generate embeddings from CAD model regions.

The set of ML models used to produce query embeddings and document embeddings may be supported by additional functions and/or ML models to form engines adapted to each mode of input/data. These support functions and additional ML models may also extract metadata that may be stored in the embedding database 140 or one or more separate databases maintained in association therewith. For example, the text embedding ML model 162 may be supported by an object character recognition (OCR) function 163 among other functions and/or ML models, collectively forming a text engine 172. Likewise, the image embedding ML model 164 may be supported by an image-to-text description ML model 165 and a natural object detector among other functions and/or ML models, collectively forming an image engine 174. Similarly, the schematic embedding ML model 166 may be supported by a schematic-to-text description ML model 167 and a classification and tag detector among other functions and/or ML models, collectively forming a schematic engine 176. Further, the CAD model embedding ML model 168 may be supported by a CAD model-to-text description ML model 169 and an element detector among other functions and/or ML models, collectively forming a CAD model engine 178.

To facilitate comparison between the query embeddings and document embeddings of different ML models 162-168, each of these ML models 162-168 may utilize a common embedding space. In one implementation, a common embedding space may be achieved through joint training of the ML models 162-168. For example, a loss function may aim to maximize similarity (e.g., cosine similarity) between embeddings for different modes of semantically similar content while minimizing the similarity between embeddings for embeddings for semantically dissimilar content.

Alternatively, at least some of these ML models 162-168 may utilize different embedding spaces, and their embeddings may be converted (e.g., by a linear transformation layer) to a common embedding space. As such, input/data that is semantically similar may be close in common embedding space regardless of its mode (e.g., the text "big red bridge," once embedded, may be close in embedding space to an embedding of an image showing a big red bridge, as well as to an embedding of an element of a CAD model representing a big red bridge).

The modules in the cloud may also include an aggregation ML model 170. The aggregation ML model 170 may combine embeddings of different ML models 162-168 (referred to in this context as "temporary embeddings") into a single embedding (referred to in this context as a "main embedding").

The modules in the cloud may also include a vector search module 180 that is configured to compare query embeddings for regions of the search input and document embeddings of the embedding database 140 to locate engineering documents. The vector search module 180 may employ a distance function (e.g., a cosine distance function, L2 distance function, a trained ML model that takes two embeddings and produces a distance, etc.) to determine closest embeddings.

The modules in the cloud may further include a filter module 190. The filter module 190 may be configured to limit the document embeddings searched by the vector search module 180 based on a comparison of filter input received from the user via the user interface 120 and metadata of the engineering documents.

The modules in the cloud may additionally include a query refinement ML model 195 configured to refine or reorder search results.

FIG. 2 is an example sequence of steps 200 that may be performed by the engineering application 100 in an indexing phase to produce an embedding database 140. The steps 200 may be repeated for each of the engineering documents in the library of engineering documents 130.

At step 210, the engineering application 100 extracts metadata from an engineering document. As mentioned above, such document metadata may include information that applies to the document as a whole, such as creation date, author, file location, etc.

At step 220, the engineering application 100 stores the document metadata in the embedding database 140 or a separate database maintained in association therewith.

At step 230, the region detector 150 of the engineering application 100 extracts one or more regions from the engineering document that each correspond to a different mode of technical or engineering data (e.g., text data, image data, schematic data or CAD model data). Where the engineering document is multimodal, multiple regions are extracted. As discussed above, the region detector 150 may employ different detection pipelines adapted to different document types. For example, for a PDF document, the region detector 150 may employ a pipeline that uses a rasterization sub-module to convert the engineering document into a raster, and an ML image region detector to extract regions from the raster. Likewise, for a schematic diagram or CAD model, the region detector 150 may employ a pipeline that uses a ML graph structure detector to extract elements from an underlying graph that represent regions. Various other type specific pipelines may be employed for detecting regions in different document types. Step 230 may be recursively repeated upon detect regions, to locate regions within regions (i.e. sub-regions).

Figure 3A:
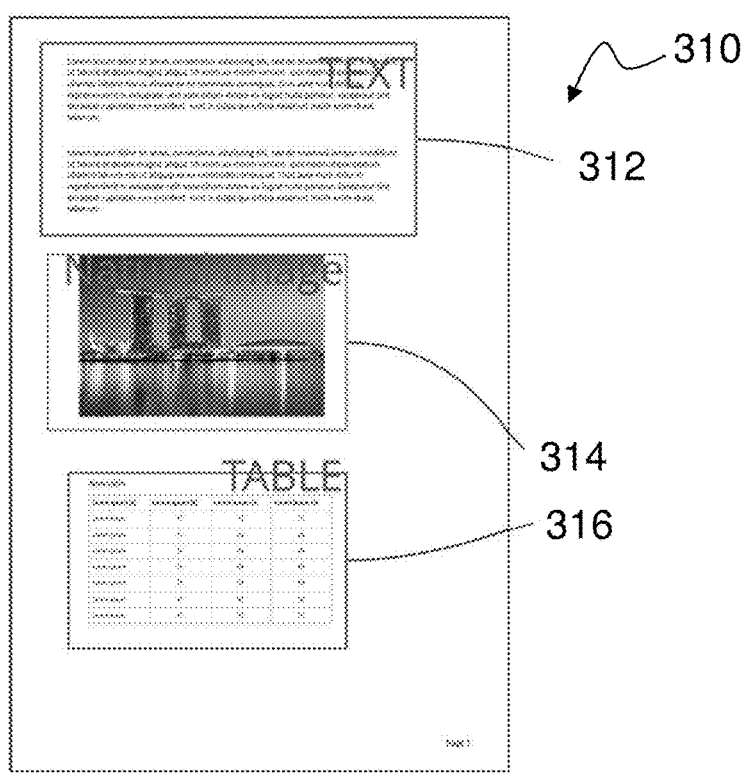
FIGS. 3A and 3B are views of example engineering documents that include multiple regions that each correspond to a different mode of technical or engineering data.
Figure 3B:
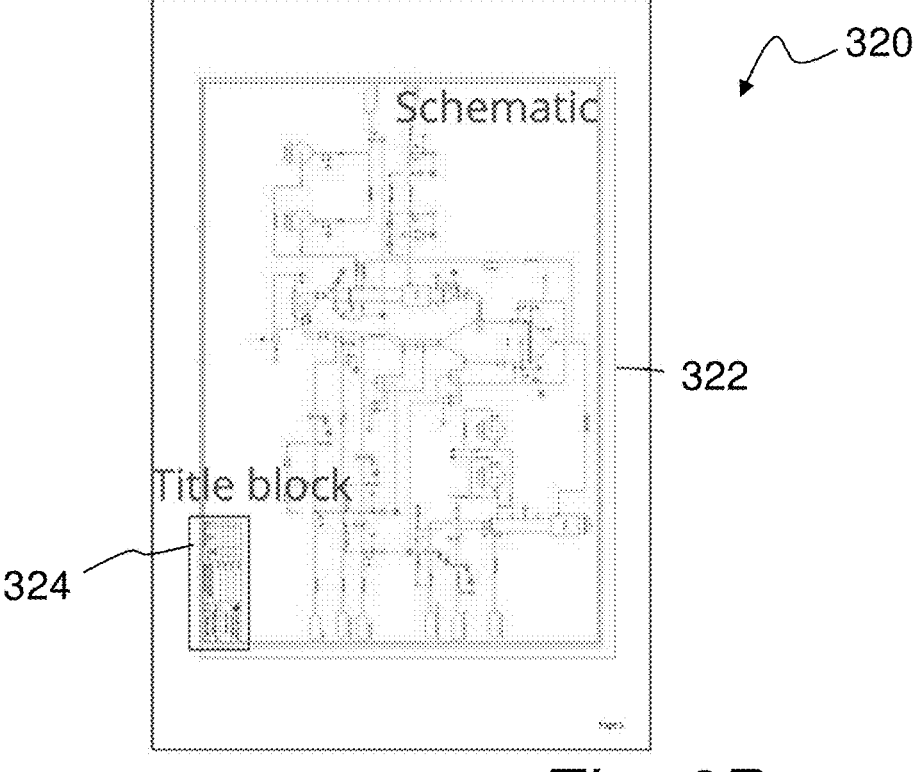

FIGS. 3A and 3B are views of example engineering documents 310, 320 that include multiple regions that each correspond to a different mode of technical or engineering data. Engineering document 310 is a PDF document. As part of step 230, the region detector 150 may detect two text regions 312, 316 (one of which is more specifically a table) and an image region 314. Engineering document 320 is a schematic diagram. As part of step 230, the region detector 150 may detect a schematic diagram region 322 and a text region 324 (which more specifically is a title block) that is located within the schematic diagram region 322 and is a sub-region thereof.

At step 240, an OCR function and/or one or more ML models of the engineering application 100 extract augmented metadata from the regions of the engineering document. For example, an OCR function may extract text from text regions by converting any raster or other image-based representations to individual characters. Similarly, a ML natural object detector may detect key objects in image regions. Likewise, a ML graph structure detectors may detect symbols of schematic regions.

At step 250, the engineering application 100 stores the augmented metadata in the embedding database 140 or a separate database maintained in association therewith.

At optional step 260, an image-to-text description ML model 165, schematic-to-text description ML model 167 and/or CAD model-to-text description ML model 169 of the engineering application 100 determines text descriptions for each region that contains a mode of technical or engineering data other than text. The text descriptions describe the semantic significance of technical or engineering data of the regions in words.

At optional step 270, the engineering application 100 stores the text descriptions in the embedding database 140 or a separate database maintained in association therewith.

At step 280, one or more ML models of the set of ML models of the engineering application 100 generate document embeddings that represent the semantic significance of technical or engineering data in each of the one or more regions. As discussed above, individual ML models may be adapted to produce embeddings based on different modes of data. For example, the text embedding ML model 162 may generate embeddings from text regions in engineering documents. Classifications for the text may also be stored in the embedding database 140 or a separate database maintained in association therewith as further augmented metadata. Likewise, the image embedding ML model 164 may generate embeddings from image regions in engineering documents. The image embedding ML model 164 may take each image region itself. Alternatively, or additionally, the image embedding ML model 164 may take a text description of the region produced by the image-to-text description ML model 165 and/or classifications of key objects from a natural object detector. The classifications may also be stored in the embedding database 140 or a separate database maintained in association therewith as further augmented metadata. Similarly, the schematic embedding ML model 166 may generate embeddings from schematic regions in engineering documents. The schematic embedding ML model 166 may take each schematic region itself. Alternatively, or additionally, the schematic embedding ML model 166 may take a text description of the region produced by the schematic-to-text description ML model 167 and/or classifications and tags extracted from schematic regions by a classification and tag detector. The classifications and tags may also be stored in the embedding database 140 or a separate database maintained in association therewith as further augmented metadata. Further, the CAD model embedding ML model 168 may generate embeddings from CAD model regions in engineering documents. The CAD model embedding ML model 168 may take each CAD model region itself. Alternatively, or additionally, the CAD model embedding ML model 168 may take a text description of the region produced by the CAD model-to-text description ML model 169 and/or classifications of individual model elements extracted from CAD model regions by an element detector. The classifications may also be stored in the embedding database 140 or a separate database maintained in association therewith as further augmented metadata.

At step 290, the engineering application 100 stores document embeddings in the embedding database 140. The stored document embeddings may simply be those produced in step 280. Alternatively, the embeddings produced in step 280 may be considered temporary document embeddings. Multiple temporary document embeddings may be provided to the aggregation ML model 170 which aggregates (i.e. combines) the temporary document embeddings to produce a main document embedding. In some cases, extracted metadata (e.g., document metadata and/or augmented metadata) and/or text descriptions may also be provided to the aggregation ML model 170 and used to produce the main document embedding. Both the temporary document embeddings and the main document embedding may be stored in the embedding database 140.

FIG. 4 is an example sequence of steps 400 that may be performed by the engineering application 100 in a query phase to produce search results. At step 410, the user interface 120 of the engineering application 100 receives search input (e.g., text input, image input, schematic input and/or CAD model input) from a user. The search input may be multimodal both in the sense that different pieces of input include different modes of input (e.g., both a piece of text and a separate image are received) and in the sense that an individual piece of input include multiple modes of input.

At step 420, the user interface 120 receives filter input from the user. The filter input may include criteria that apply to the document as a whole, such as creation date, author, file location, etc. The filter input may also include criteria applies that applies to a region of the engineering document, such as a requirement of text therein, objects therein, classifications or tags for symbols or elements therein, etc.

At step 430, the region detector 150 of the engineering application 100 extracts one or more regions from the search input that each correspond to a different mode of input (e.g., text input, image input, schematic input, CAD model input, etc.). Where the search input is multimodal, multiple regions are extracted. As discussed above, the region detector 150 may employ different detection pipelines adapted to different input types. Step 430 may be recursively repeated upon detect regions, to locate regions within regions (i.e. subregions).

At optional step 440, the image-to-text description ML model 165, schematic-to-text description ML model 167 and/or CAD model-to-text description ML model 169 of the engineering application 100 determines a text description for each region that contains a mode of input other than text data describing the semantic significance of input of the region.

At step 450, one or more ML models of the set of ML models generates query embeddings that represent the semantic significance of input in each of the one or more regions. The query embeddings may be produced similarly to the document embeddings. The text embedding ML model 162 may generate embeddings from text regions of search input. Likewise, the image embedding ML model 164 may generate embeddings from image regions of search input. The image embedding ML model 164 may take each image region itself. Alternatively, or additionally, the image embedding ML model 164 may take a text description of the region produced by the image-to-text description ML model 165 and/or classification of key objects from a natural object detector. Similarly, the schematic embedding ML model 166 may generate embeddings from schematic regions of search input. The schematic embedding ML model 166 may take each schematic region itself. Alternatively, or additionally, the schematic embedding ML model 166 may take a text description of the region produced by the schematic-to-text description ML model 167 and/or classifications and tags extracted from schematic regions by a classification and tag detector. Further, the CAD model embedding ML model 168 may generate embeddings from CAD model regions of search input. The CAD model embedding ML model 168 may take each CAD model region itself. Alternatively, or additionally, the CAD model embedding ML model 168 may take a text description of the region produced by the CAD model-to-text description ML model 169 and/or classifications of individual model elements extracted from CAD model regions by an element detector.

The query embeddings produced in step 450 may be directly used in subsequent operations. Alternatively, the query embeddings produced in step 450 may be considered temporary query embeddings. Multiple temporary query embeddings may be provided to the aggregation ML model 170 which aggregates (i.e. combines) the temporary query embeddings to produce a main query embedding. In some cases, additional information from the search input and/or text descriptions may also be provided to the aggregation ML model 170 and used to produce the main query embedding.

At step 460, the vector search module 180 compares query embeddings (e.g., the main query embedding and/or temporary embeddings) and document embeddings of the embedding database 140 to locate engineering documents. Engineering documents having closest embeddings in embedding space as measured by a distance function are returned. The documents having the closest embeddings should be those most semantically similar to the search input regardless of the mode of data contained therein. The number of engineering documents returned may be predetermined (e.g., the closest x documents may be returned) or dynamically chosen (e.g., any documents that are within a distance x may be returned). The returned documents may be ordered based on distance in embedding space, so that those that are the most semantically similar are ahead of those with a lesser degree of semantic similarity.

To speed the operation of the vector search module, the search space may be limited based on a comparison of the filter input received in step 420 and the metadata (e.g., document metadata and/or augmented metadata) stored in the embedding database 140 or separate database maintained in association therewith. The engineering application may limit the document embeddings subject to comparison with the query embeddings to those associated with engineering documents that satisfy criteria of the filter input.

At step 470, the engineering application 100 optionally performs an auxiliary search that compares at least a portion of the search input directly to the document metadata in the embedding database 140 or separate database maintained in association therewith. The auxiliary search may utilize a traditional search engine. Results of the auxiliary search may be added to those of the embedding-based search of step 460, or used to filter such results, to improve the returned results.

At step 480, the user interface 120 of the engineering application 100 displays search results based on the engineering documents selected in the embedding-based search of step 460 and, optionally, the auxiliary search of step 470. The search results may include the entire engineering documents, regions of the engineering documents, or specific information (e.g., text, images, schematic diagram symbols, and CAD model elements, etc.) extracted from the engineering documents. The search results may be displayed in order based on distance in embedding space, so that the most semantically similar results are displayed first.

At optional step 490, the user interface 120 of the engineering application 100 receives query refinement text from the user. The query refinement text may provide a directive based on the search results (e.g., "show more like result #1", "exclude results that include bridges", etc.).

At optional step 495, the query refinement ML model 195 generates a score for each of the search results based on the query refinement text, the original search input, and the search results themselves. The query refinement ML model 195 may also take additional information, such as document metadata, as input.

At optional step 497, the user interface 120 of the engineering application 100 displays refined or reordered search results based on the scores produced by the query refinement ML model 195. For example, search results may be reordered to first display those with a greatest score or to only display those with a score over a given threshold.

In summary, the above description describes an example semantic multimodal search function for searching for engineering documents. It should be understood that additional extensions, adaptations, modifications, and the like may be readily made to improve the described capabilities or to provide additional capabilities.

While it is described above that functionality may be implemented in a specific manner by software on specific hardware, it should be understood that the functionality may also be implemented in different manners by different software on different hardware. Software may include instructions in a high-level programming language or low-level programming language that may be stored and compiled or interpreted to run on hardware. For example, instructions may be stored on a non-transitory electronic device readable medium and when executed on one or more processors is operable to implement the functionality. Further, it should be understood that functionality may be implemented in hardware itself.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. What is claimed is:

The invention claimed is:

1. A method for searching for engineering documents, comprising:

receiving, by an engineering application executing on one or more computing devices, search input from a user;

extracting from the search input, by a region detector of the engineering application, a plurality of regions that each correspond to a different mode of input of a plurality of modes of input, wherein the plurality of regions of the search input includes at least one region that corresponds to schematic input or computer aided design (CAD) model input, and at least one other region that corresponds to text input or image input;

generating one or more query embeddings that represent a semantic significance of input in each of the plurality of regions using a plurality of machine learning (ML) models of the engineering application, wherein the plurality of ML models includes a ML model adapted to produce first query embeddings that represent the semantic significance of the schematic input or CAD model input and a ML model adapted to produce second query embeddings that represent the semantic significance of text input or image;

comparing, by the engineering application, the one or more query embeddings and a plurality of document embeddings of an embedding database that each correspond to a respective engineering document maintained in a library of engineering documents, and selecting one or more engineering documents having closest document embeddings; and displaying search results based on the selected one or more engineering documents.

2. The method of claim 1, wherein the first and second query embeddings are temporary query embeddings, and the generating the one or more query embedding comprises:

generating for each of the plurality of regions, by a respective ML model adapted to the mode of input in the respective region, a temporary query embedding that represents the semantic significance of input in the respective region to produce a set of temporary query embeddings;

aggregating, by an aggregation ML model of the engineering application, two or more of the set of temporary query embeddings to produce a main query embedding; and using the main query embedding in the one or more query embeddings.

3. The method of claim 1, wherein the generating the one or more query embeddings comprises:

determining for a region of the plurality of regions that contains a mode of input other than text input, a text description describing the semantic significance of input in the respective region;

generating, by a ML model adapted to text input, a query embedding based on the text description; and including the query embedding in the one or more query embeddings.

4. The method of claim 1, wherein the comparing the one or more query embeddings and the plurality of document embeddings comprises:

determining a distance between the one or more query embeddings and the plurality of document embeddings; and selecting the one or more engineering documents whose document embeddings have a smallest distance.

5. The method of claim 1, further comprising:

receiving, by the engineering application, filter input from the user;

limiting the plurality of document embeddings of an embedding database subject to the comparison with the one or more query embeddings based on a comparison of the filter input and metadata extracted from engineering documents.

6. The method of claim 1, further comprising:

receiving, by the engineering software, query refinement text from the user;

generating, by an additional ML model of the engineering application, a score for each of the search results based on the query refinement text, the search input, and the search results themselves; and refining or reordering the search results based on the scores.

7. The method of claim 1, further comprising:

indexing the library of engineering documents to build the embedding database by:

for each of a plurality of engineering documents in the library of engineering documents, extracting from the engineering document, by the region detector, one or more regions that each correspond to a different mode of technical or engineering data of a plurality of modes of technical or engineering data, wherein the plurality of modes of technical or engineering data include text data, image data, schematic data and CAD model data;

generating, by the one or more ML models, one or more document embeddings that represent a semantic significance of technical or engineering data in each of the one or more regions; and storing the one or more document embeddings in the embedding database.

8. The method of claim 7, wherein the generating the one or more document embeddings comprises:

generating for each of the one or more regions, by a respective ML model adapted to the mode of technical or engineering data in the respective region, an embedding that represents the semantic significance of technical or engineering data in the respective region to produce a set of temporary document embeddings;

aggregating, by the aggregation ML model, two or more of the set of temporary document embeddings to produce a main document embedding; and including the main embedding in the embedding database.

9. The method of claim 7, wherein the generating the one or more document embeddings comprises:

determining for a region of the one or more regions that contains a mode of technical or engineering data other than text data, a text description describing the semantic significance of technical or engineering data of the respective region;

generating, by a ML model adapted to text data, a document embedding based on the text description; and including the document embedding in the embedding database.

10. The method of claim 7, wherein the indexing the library of engineering documents comprises:

for each of a plurality of engineering documents in the library of engineering documents, extracting metadata from the engineering document; and storing the extracted metadata in connection with the one or more document embeddings.

11. The method of claim 10, wherein the metadata includes augmented metadata that represents classifications or tags for symbols or elements within at least one of the one or more regions.

12. A non-transitory computing device readable medium having instructions stored thereon, the instructions when executed by one or more computing devices operable to:

index a library of engineering documents to build an embedding database by:

for each of a plurality of engineering documents in the library of engineering documents, extracting from the engineering document one or more regions that each correspond to a different mode of technical or engineering data, generating one or more document embeddings that represent a semantic significance of technical or engineering data in each of the one or more regions, and storing the one or more document embeddings in the embedding database;

query the library of engineering documents by:

receiving search input, extracting from the search input a plurality of regions that each correspond to a different mode of input of a plurality of modes of input, wherein the plurality of regions of the search input includes at least one region that corresponds to schematic input or computer aided design (CAD) model input, and at least one other region that corresponds to input other than schematic input or CAD model input;

generating one or more query embeddings that represent a semantic significance of input in each of the plurality of regions, wherein the generating produces first query embeddings that represent the semantic significance of the schematic input or CAD model input and second query embeddings that represent the semantic significance of text input or image; and comparing the one or more query embeddings and the one or more document embeddings of the embedding database, and selecting one or more engineering documents based on the comparison; and display search results based on the selected one or more engineering documents.

13. The non-transitory electronic-device readable medium of claim 12, wherein the instructions to index the library of engineering documents comprise instructions that when executed are operable to:

generate for each of the one or more regions a temporary document embedding that represents the semantic significance of technical or engineering data in the respective region to produce a set of temporary document embeddings;

aggregate two or more of the set of temporary document embeddings to produce a main document embedding; and include the main embedding in the embedding database.

14. The non-transitory electronic-device readable medium of claim 12, wherein the instructions to index the library of engineering documents comprise instructions that when executed are operable to:

determine for a region of the one or more regions that contains a mode of technical or engineering data other than text data, a text description describing the semantic significance of technical or engineering data of the respective region;

generate a document embedding based on the text description; and include the document embedding in the embedding database.

15. The non-transitory electronic-device readable medium of claim 12, wherein the instructions to query the library of engineering documents comprise instructions operable to:

determine a distance between the one or more query embeddings and the plurality of document embeddings; and select the one or more engineering documents whose document embeddings have a smallest distance.

16. The non-transitory electronic-device readable medium of claim 12, wherein the input other than schematic input or CAD model input includes text input or image input, and the plurality of modes of technical or engineering data include text data, image data, schematic data and CAD model data.

17. The non-transitory electronic-device readable medium of claim 12, wherein the instructions when executed are further operable to:

receive filter input; and limit the plurality of document embeddings of the embedding database subject to the comparison with the one or more query embeddings based on a comparison of the filter input and metadata extracted from engineering documents.

18. The non-transitory electronic-device readable medium of claim 12, wherein the instructions when executed are further operable to:

receive query refinement text;

generate a score for each of the search results based on the query refinement text, the search input, and the search results themselves; and refine or reorder the search results based on the scores.

19. A computing device comprising:

a display screen;

a processor; and a memory coupled to the processor and configured to store an engineering application that utilizes one or more machine learning (ML) models, the engineering application when executed is operable to:

receive search input from a user, extract from the search input a plurality of regions that each correspond to a different mode of input of a plurality of modes of input, wherein the plurality of regions of the search input includes at least one region that corresponds to schematic input or computer aided design (CAD) model input, and at least one other region that corresponds to text input or image input, generate, using the one more ML models, one or more query embeddings that represent a semantic significance of input in each of the plurality of regions, the one or more ML models to produce first query embeddings that represent the semantic significance of the schematic input or CAD model input and second query embeddings that represent the semantic significance of text input or image, compare the one or more query embeddings and a plurality of document embeddings of an embedding database that each correspond to a respective engineering document maintained in a library of engineering documents, and select one or more engineering documents having closest document embeddings, and display search results based on the selected one or more engineering documents.

20. The computing device of claim 19, wherein the first and second query embeddings are temporary query embeddings, and the engineering application when executed is further operable to:

generate for each of the plurality of regions a temporary query embedding that represents a semantic significance of input in the respective region to produce a set of temporary query embeddings;

aggregate two or more of the set of temporary query embeddings to produce a main query embedding; and use the main query embedding in the one or more query embeddings.

* * * * *